Oct. 3, 1950

C. B. LUBBERT ET AL 2,524,267

WORK HOLDING DEVICE

Filed July 3, 1947

INVENTORS
C.B. LUBBERT
M.W. SEARS
BY
ATTORNEY

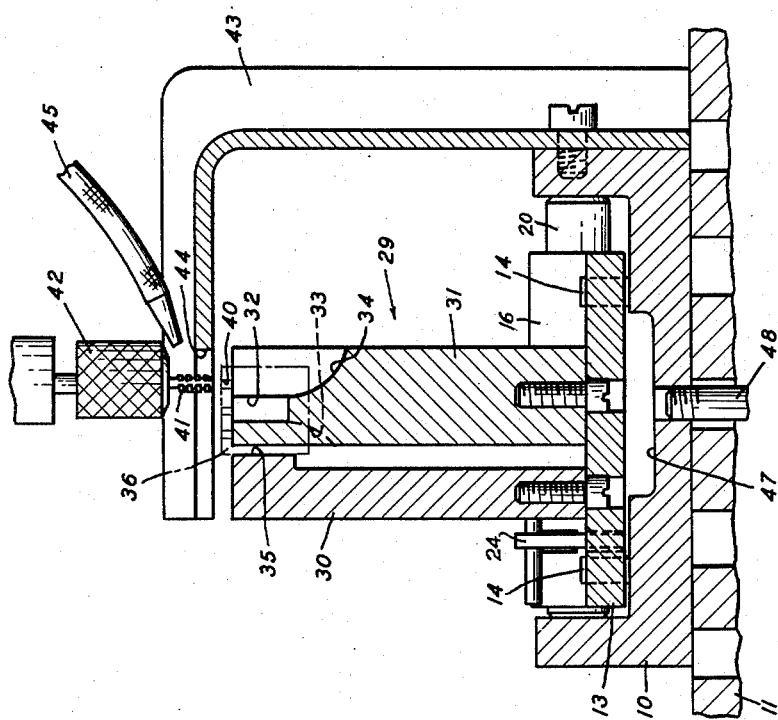
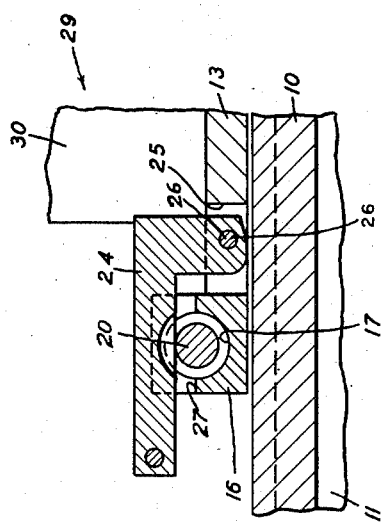

Patented Oct. 3, 1950

2,524,267

UNITED STATES PATENT OFFICE 2,524,267

WORK HOLDING DEVICE

Carl B. Lubbert, Anneslie, and Murl W. Sears, Catonsville, Md., assignors to Western Electric Company, Incorporated, New York, N. Y., a corporation of New York Application July 3, 1947, Serial No. 758,910

2 Claims. (Cl. 10—129)

This invention relates to work holding devices, and more particularly to a device for holding a piece part during a tapping operation.

In the manufacture of apparatus fabricated from a plurality of piece parts, many assemblies and subassemblies of such parts are held together or in place by various types of machine screws, in which case many of these piece parts require certain drilling and tapping operations during the processing thereof. When a substantial quantity of parts is involved it is generally the custom in most manufacturing industries to employ mass production methods in the manufacture of such parts. When mass production methods are adopted, a certain machine, such as a drilling machine or a tapping machine, is arranged with suitable jigs and fixtures to enable the machine to produce its particular operation on a large quantity of identical piece parts. Where the machines are arranged to perform only the drilling operations on the piece parts, a suitable jig or template is used to assist the operator in locating the piece part with respect to the drill so that a minimum amount of manual manipulation of the part is required of the operator.

However, where a machine is set up to perform the tapping operation on the piece parts a jig cannot be used to assist the operator in locating the hole in the part directly under the tap of the machine due to the nature of the tap. This means that the operator must align each hole of the piece part directly under the tap in at least two major directions by a plurality of manual manipulations or a seesaw movement of the piece part until the hole is directly under the tap. In other words, the operator is required to locate the hole in the part directly under the tap by sight, and when the hole to be tapped is relatively small in diameter, the procedure is tedious and causes strain on the operator's eyes.

An object of the invention is to provide new and improved work holding devices.

Another object of the invention is to provide a device for holding a piece part during a tapping operation thereon, which will minimize the work required by the operator in locating the hole of the piece part directly under the tap of the tapping machine.

A work holding device embodying features of the invention comprises a work holding carriage slidably positioned on a base arranged to be rigidly secured to a work plate of a suitable tapping machine. A piece part having a plurality of holes to be tapped is positioned on the top of the carriage, and means are provided on the carriage for selectively indexing each common axis of the group of holes to be tapped out with the center of the tapping machine. In this manner, only longitudinal movement of the carriage is required of the operator to locate the respective holes along the common axis of the part with the tap of the tapping machine, thereby eliminating all other manual manipulations which would otherwise be required to locate the particular hole to be tapped directly under the tap.

A clear understanding of the invention will be had from the following detailed description of a specific embodiment thereof, when read in conjunction with the appended drawings, in which:

Fig. 2 is an enlarged, vertical, sectional view taken along line 2—2 of Fig. 1, and Fig. 3 is an enlarged, horizontal, sectional view taken along line 3—3 of Fig. 1.

Figure 1:
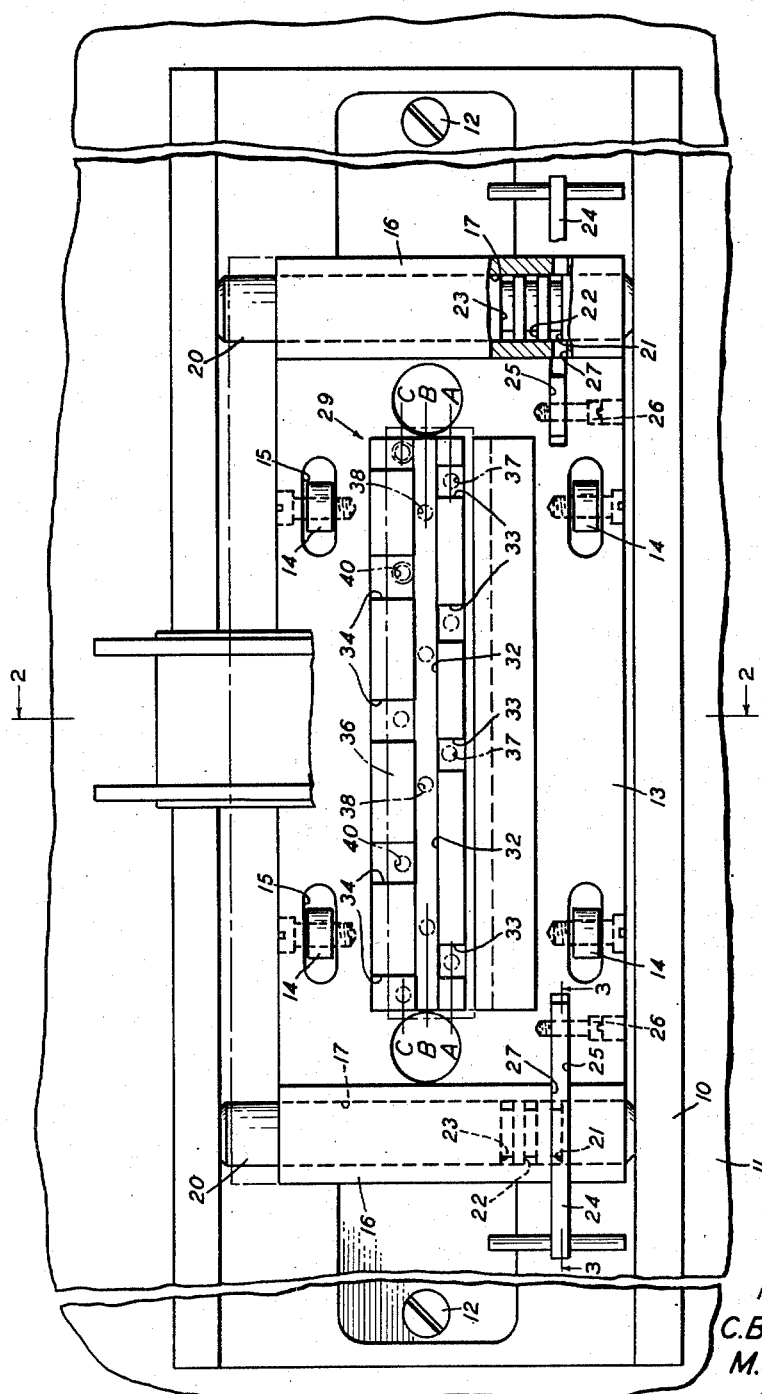
Fig. 1 is a plan view of a work holding device forming a specific embodiment of the invention.

Referring now to the drawings, and more particularly to Fig. 1, a channel-shaped base 10 is rigidly secured to a work supporting plate 11 of a conventional tapping machine (not shown), by means of screws 12—12. A rectangular plate 13 is positioned within the walls of the channel-shaped base 10 and is provided with a plurality of rollers 14—14 positioned in slots 15—15 provided in the plate so that the periphery of the rollers extends slightly beyond the bottom face of the plate 13 and engages the bottom of the base 10. The rollers being positioned in this manner on the plate 13 serve to hold the bottom face of the plate 13 above the bottom of the base 10, thereby allowing the plate to be rolled longitudinally along the bottom of the base 10. A square rod 16 is welded to each end of the plate 13 so that the bottom thereof is flush with the bottom face of the plate 13. Each of the rods 16—16 is of such length that their ends are flush with the corresponding sides of the plate 13. Each of the rods 16—16 is provided with a bore 17 therethrough, which is arranged to slidably receive an indexing pin 20. The pins 20—20 are of such length that they only slidably engage the inner surfaces of the side walls of the channel-shaped base 10 and do not interfere with the free longitudinal movement of the plate 13.

Each of the indexing pins 20—20 (Fig. 1) is provided with a front indexing groove 21, a central indexing groove 22 and a rear indexing groove 23, all of which grooves are positioned substantially near the front end of the square ends 16—16 of the plate 13. An indexing arm 24 is pivotally mounted in a slot 25 provided at each end of the plate 13 by means of a screw 26 (Fig. 3). A slot 27 is provided in each of the square ends 16—16 and is aligned with the adjacent slot 25 in the plate 13, so that the arms 24—24 may pass into the slots 27—27 and engage the periphery of the pin 20. It is believed to be apparent that when the arms 24—24 are raised out of the slots 27—27, the plate 13 and the arms 24—24 mounted thereon can be moved transversely on the pins 20—20 between the walls of the base 10. By means of this transverse movement of the plate 13 it is possible to align the slots 27—27 selectively with any particular one of the indexing grooves 21, 22 or 23, depending on the amount of transverse movement imparted to the plate 13, so that the arms 24—24 may be lowered into the selected indexing grooves in the pins 20—20.

An elongated L-shaped guide 30 (Fig. 2) is rigidly secured in an inverted manner on the plate 13 so that it is parallel with the central axis of the base 10. A support 31 is also rigidly secured on the plate 13 parallel to the central axis of the base 10. The upper end of the support 31 is provided with a longitudinal groove 32, a plurality of front cutouts 33—33 which communicate with the groove 32 and a plurality of rear cutouts 34—34 which also communicate with the groove 32. The guide 30 and the support 31 are positioned on the plate 13 to leave an opening 35 between the short leg of the guide 30 and the front face of the support 31. The assembly including the plate 13, the arms 24—24, the indexing pins 20—20, the guide 30 and the support 31 form a movable work supporting carriage indicated generally at 29. Referring to Fig. 1 of the drawings, it will be noted that the carriage 29 is positioned with respect to the base 10 so that the arms 24—24 are shown in engagement with the front indexing grooves 21—21 of the indexing pins 20—20.

A typical piece part having holes therein to be tapped is indicated in broken lines on the drawings generally at 36 (Figs. 1 and 2) as an elongated angle-shaped piece part having a plurality of holes 37—37 along a common axis A—A, a plurality of holes 38—38 along a common axis B—B and a plurality of holes 40—40 along a common axis C—C located on one leg thereof. The piece part 36 is positioned on the carriage 29 so that the leg having the holes therein to be tapped rests on the top surface of the support 31, while the other leg thereof fits neatly into the opening 35. The ends of the piece part 36 slidably engage the ends of the support 31, whereby the piece part is positioned so that the cutouts 33—33, the longitudinal groove 32 and the cutouts 34—34 are aligned directly under the holes along the A—A, B—B and C—C axes, respectively. This alignment of the holes with the cutouts and groove permits a tap 41 secured in a tapping head 42 of a conventional tapping machine (not shown) to pass completely into and through the particular hole to be tapped. When the tap 41 has passed completely through the hole in the piece part 36, the tapping head 42 is raised slightly which reverses the tapping head 42 so that continued upward movement of the tapping head backs the tap 41 out of the hole.

An angle-shaped bracket 43 (Figs. 1 and 2) is secured to the base 10 and has its horizontal leg extending across the piece part 36 to hold it in place as the tap 41 is withdrawn therefrom. A slot 44 is provided in the horizontal leg of the bracket 43 to allow the tap 41 to pass therethrough and into the holes in the piece part. A suitable lubricant for the tapping operations is directed against the tap 41 by a suitable nozzle 45 provided on the tapping machine (not shown). The liquid lubricant also serves to wash the chips resulting from the tapping operation down through the cutouts 33—33 and 34—34 to a groove 47 provided in the bottom of the base 10. A suitable pipe 48 is threaded into a tapped bore provided in the base 10 and communicating with the groove 47 to draw off the liquid lubricant collecting in the groove. Since the base 10 is designed to permit the carriage to be moved from the left side of the tap 41 to the right side of the tap, or vice versa, the piece part 36 may be positioned on the carriage and the tapping operation commenced thereon from either side of the tap. The pitch of the indexing grooves 21—21, 22—22 and 23—23 provided on the pins 20—20 is designed to be equal to the spacing between the A—A, B—B and C—C axes, so that when the base 10 is secured on the work plate 11 with the A—A axis it is aligned with the tapping axis of the tapping head 42, as seen in Figs. 1 and 2 on the drawings, the carriage 29 may be selectively positioned transversely of the base 10 so as to align the remaining B—B and C—C axes with the tapping axis of the tapping head.

The above-described apparatus operates as follows:

The angle-shaped piece part 36 is positioned on the carriage 29 so that the leg having holes 37—37 located along the A—A axis, holes 38—38 along the B—B axis and holes 40—40 along the C—C axis rests on the upper face of the support 31, while the other leg is positioned in the opening 35 between the guide 30 and the support 31. The closed ends of the piece part slidably engage the ends of the support 31 so that holes therein are aligned over the front cutouts 33—33, the central groove 32 and the rear cutouts 34—34. The carriage 29 is positioned with respect to the side walls of the channel-shaped base 10 so that the indexing arms 24—24 engage the front indexing grooves 21—21 provided in the indexing pins 20—20. The base 10 is then secured on the work plate 11 of a conventional tapping machine (not shown) so that the C—C axis of the holes 40—40 (Fig. 2) is aligned with the central axis of the tapping machine, that is, the operating axis of the tapping head 42 and tap 41 secured therein.

The carriage 29 is now moved to the right until the hole 40 adjacent to the right end of the piece part 36 is directly under the tap 41. The tap 41 is lowered into the hole 40 to tap a suitable thread therein. The tap 41 is then withdrawn from this hole and the carriage 29 rolled further to the right along the base 10 until the second hole 40 on the C—C axis is directly under the tap 41 so that the tap may be urged into this hole and tap a thread therein. This same procedure is followed for tapping each of the holes 40—40 lying on the C—C axis. After all of the holes 40—40 are tapped, the indexing arms 24—24 are raised upwardly out of engagement with the grooves 21—21, and the carriage 29 is moved transversely with respect to the longitudinal axis of the base 10 until the central indexing grooves 22—22 are aligned with the slots 27—27 provided in the square ends 16—16 of the carriage. The indexing arms are then lowered into the central grooves 22—22 of the indexing pins and thereby maintain the carriage 29 in this position free from lateral movement with respect to the walls of the base 10.

Since the pitch of the indexing grooves 21—21, 22—22 and 23—23 is equal to the distance between the A—A, B—B and C—C axes, the positioning of the indexing arms 24—24 in the central indexing grooves 22—22 aligns the B—B axis of the holes 38—38 with the tapping axis of the machine. Since the previous tapping operation ended up with the left end of the carriage 29 positioned to the right of the tap 41, it is now moved slightly to the left to align the left hand hole 38 lying on the B—B axis directly under the tap 41 and the hole is tapped in the manner described for the holes 40—40. After all of the holes 38—38 lying along the B—B axis have been tapped, the indexing arms 24—24 are raised out of engagement with the central indexing grooves 22—22 and the carriage 29 is moved transversely until the indexing grooves 23—23 are aligned with the slots 27—27 provided in the ends of the carriage. The indexing arms are then lowered into the slots 27—27 and into engagement with the rear indexing grooves 23—23 of the pins 20—20, whereupon the A—A axis of the holes 37—37 is now aligned with the tapping axis of the machine.

Since the tapping operations of the holes 38—38 ended up with the right end of the carriage 29 positioned to the left of the tap 41, the carriage is now moved slightly to the right to align the right hand hole 37 directly under the tap 41. The tap is lowered into the right hand hole 37 to tap a thread therein, after which each of the remaining holes 37—37 lying on the A—A axis is tapped in the same manner described for the holes 38—38 and 40—40.

After the above-described tapping operations are completed on the piece part 36, it may be readily removed from the carriage 29 and another identical piece part may be positioned on the support 31. The same tapping procedure is followed with the second piece part positioned on the support 31, with the exception that the operator leaves the indexing arms in the indexing grooves 23—23 and proceeds to tap the holes 37—37 lying along the A—A axis and working from the A—A axis through the B—B axis to the C—C axis, or in other words, the reverse order from that followed in the above description for the piece part 36. This procedure is followed in tapping the holes in subsequent piece parts in order to minimize the movement of the carriage 29 to effect the loading of a piece part thereon and in locating the holes of the particular piece part directly under the tap 41 of the tapping machine.

While the above-described device is designed to hold an angle-shaped piece part, such as the piece part 36, the support 31 may be readily modified to accommodate angle-shaped piece parts of various lengths and also flat piece parts having similar hole layout patterns.

What is claimed is:

1. A work holding device for use with tapping machines, which comprises a channel-shaped base adapted to be rigidly secured to the work table of a tapping machine, a plate positioned between the vertical walls of the base, rollers mounted on the plate to permit longitudinal movement of the plate within the base, a work support positioned on the plate, a guide member positioned on the plate adjacent to the support so as to leave a predetermined opening therebetween at the upper ends thereof, said support being arranged to receive one leg of an angle-shaped piece part having a plurality of holes along several parallel axes to be tapped, said opening being provided between the guide member and the support for receiving the other leg of the angle-shaped piece part, a pin slidably mounted in a transverse position at each end of the plate, said pins being of such length that the ends thereof slidably engage the walls of the channel-shaped base and having a plurality of annular grooves therein adjacent to one end thereof, and means hingedly mounted on the plate for engaging the grooves in the pins so as to selectively position the plate transversely with respect to the said base, whereby the work support may be positioned to align each axis of the holes in the piece part with the tap of the tapping machine.

2. A work holding device for use with tapping machines, which comprises a channel-shaped base adapted to be rigidly secured to the work table of a tapping machine, a rectangular plate positioned within the walls of the channel-shaped base, a plurality of rollers mounted on the plate for providing free longitudinal movement of the plate along the base, a support positioned on the plate for receiving one leg of an angular-shaped piece part having a plurality of holes therein lying along several parallel axes to be tapped, a guide member secured on the plate adjacent to the piece part support so as to leave an opening therebetween for receiving the other leg of an angular-shaped piece part, said work support having portions of its supporting surface notched to permit the tap of the tapping machine to pass through the hole in the piece part to be tapped, a pin slidably mounted on each end of the plate and being of such length that the ends thereof slidably engage the walls of the channel-shaped base, said pins having a plurality of annular grooves provided therein adjacent to one end thereof, said plate having a slot in each end thereof above the slidably mounted pin which may be aligned with the grooves provided in the pins by transverse movement of the plate, an arm pivotally mounted in each end of the plate so as to slidably engage the grooves provided in the pin whereby the plate may be selectively positioned transversely between the walls of the base to align each axis of the holes in the piece part directly under the tapping axes of the tapping machine, and means provided on the base and extending across the top surface of the piece part positioned on the support to hold the piece part in place while the tap of the tapping machine is being withdrawn from a tapped hole.

CARL B. LUBBERT.
MURL W. SEARS.

REFERENCES CITED

The following references are of record in the file of this patent:

UNITED STATES PATENTS

| Number | Name | Date |
|---|---|---|
| 315,149 | Lamb | Apr. 7, 1885 |
| 395,592 | Schwarzler | Jan. 1, 1889 |
| 1,556,722 | Scott | Oct. 13, 1925 |
| 2,024,250 | Roehin | Dec. 17, 1935 |
| 2,356,300 | Boettcher | Aug. 22, 1944 |
| 2,387,440 | Guellich | Oct. 23, 1945 |